United States Patent
Stol et al.

(10) Patent No.: US 7,115,324 B1
(45) Date of Patent: Oct. 3, 2006

(54) METHOD OF COMBINING WELDING AND ADHESIVE BONDING FOR JOINING METAL COMPONENTS

(75) Inventors: Israel Stol, Pittsburgh, PA (US); Sherri F. McCleary, Apollo, PA (US); Paula L. Price, New Kensington, PA (US)

(73) Assignee: Alcoa Inc., Pittsburgh, PA (US)

( * ) Notice: Subject to any disclaimer, the term of this patent is extended or adjusted under 35 U.S.C. 154(b) by 108 days.

(21) Appl. No.: 10/652,404

(22) Filed: Aug. 29, 2003

(51) Int. Cl.
*B32B 3/30* (2006.01)
*B32B 3/10* (2006.01)
*B32B 3/06* (2006.01)
*B32B 1/06* (2006.01)
*B23K 28/00* (2006.01)

(52) U.S. Cl. .................. 428/594; 428/578; 428/582; 428/614; 428/157; 419/76.1; 419/104; 419/136; 419/137 R; 225/175; 225/112.1

(58) Field of Classification Search ........... 428/594, 428/578, 582, 614, 157; 219/76.1, 104, 78.02, 219/136, 137 R; 228/175, 112.1
See application file for complete search history.

(56) References Cited

U.S. PATENT DOCUMENTS

| | | | |
|---|---|---|---|
| 3,822,464 A * | 7/1974 | Hester et al. | 428/355 AC |
| 3,929,270 A * | 12/1975 | Keith | 228/50 |
| 4,439,263 A | 3/1984 | Hardigg et al. | 156/497 |
| 4,727,232 A * | 2/1988 | Omori et al. | 219/91.2 |
| 4,757,232 A * | 7/1988 | Berkstresser et al. | 313/468 |
| 4,843,218 A | 6/1989 | Husslein et al. | 219/468 |
| 5,079,408 A | 1/1992 | Jordan, Jr. | 219/461 |
| 5,739,498 A * | 4/1998 | Sunamoto et al. | 219/78.15 |
| 5,897,964 A | 4/1999 | White et al. | 428/630 |
| 6,080,968 A | 6/2000 | Taylor | 219/441 |
| 6,109,506 A * | 8/2000 | Blair et al. | 228/175 |
| 6,291,792 B1 | 9/2001 | Fussegger et al. | 219/118 |
| 6,328,261 B1 * | 12/2001 | Wollaston et al. | 244/132 |
| 6,364,250 B1 * | 4/2002 | Brinck et al. | 244/119 |
| 6,450,394 B1 * | 9/2002 | Wollaston et al. | 228/112.1 |
| 6,582,539 B1 * | 6/2003 | Iwanczyk et al. | 156/73.5 |
| 6,698,809 B1 * | 3/2004 | Stol et al. | 293/133 |

FOREIGN PATENT DOCUMENTS

GB        887319        1/1962

* cited by examiner

*Primary Examiner*—Jennifer C. McNeil
*Assistant Examiner*—Jason L. Savage
(74) *Attorney, Agent, or Firm*—Greenberg Traurig LLP; Harry A. Hild, Jr.

(57) ABSTRACT

A method of joining metal components having the steps of depositing adhesive material between the components and welding the components together via solid-state or fusion welding. The welds are spaced apart from the adhesive material and are produced so as to prevent exposure of the adhesive material to the welding. The two types of bonds (adhesive and welding) are produced in the components separated by time and space.

20 Claims, 5 Drawing Sheets

METHOD OF COMBINING WELDING AND ADHESIVE BONDING FOR JOINING METAL COMPONENTS

BACKGROUND OF THE INVENTION

1. Field of the Invention

The present invention relates to methods of joining metal components, more particularly to a method of joining metal components involving welding the components together and inserting an adhesive between the welded components.

2. Prior Art

Metal components are conventionally joined together in a variety of techniques including fusion welding, solid state bonding, chemical/mechanical bonding and mechanical engagement and locking. In fusion welding, the components are joined together through coalescence of molten metals. A weld between the components occurs when the molten metals of the components intermix and solidify. Conventional processes which are based upon fusion welding include gas metal arc welding (e.g. gas tungsten arc welding) and laser beam welding. In solid-state joining of metal components, interfacial diffusion between the mating surfaces is achieved by forcing the parts together under pressure and application of heat at the interface between the components or forcing together simultaneously plasticized metals such as in friction stir welding and forging. Chemical/mechanical bonding of metal components includes the use of adhesives, mechanical engagement of locking of components such as via bolts, rivets, and other such fasteners.

In certain circumstances where structural redundancy is important or additional sealing is required between the two components, two of these joining processes may be combined to impart their particular beneficial characteristics to the overall performance of the joint. This approach of using two joining processes has been utilized in the aerospace, automotive and transportation industries. Typically, mechanical fasteners are used to join components along with adhesives or sealants. Such joints that include mechanical fasteners and adhesives have been strong and reliable.

However, a combination of fusion and solid state based welding processes with chemical/mechanical bonding processes (e.g., using adhesives) has been problematic. Metallurgical incompatibilities arise when these two processes are applied either simultaneously at the same joining area or even when the two processes are performed sequentially. Contact between adhesive (typically an organic material) and hot molten plasticized metals, which form during welding, results in serious damage to the integrity of both the welded joint and the adhesive bond. In some instances, contact between the molten metal of the weld and the adhesive causes the adhesive to violently disintegrate into hydrocarbonaceous fumes which disrupts the stability of the welding process (such as the welding arc, laser beam generated plasma over a keyhole and molten pool), introduces contaminants into solidifying welds (producing gross open and bulk pores, craters, inclusions and excessive crud on the surface) and leads to inconsistent weld geometries. If an adhesive is applied while welding is occurring, the weld may become displaced or change shape by the fumes erupting from the adhesive, become petrified in distinct locations or develop uncontrolled pores and skips, all of which lead to compromised joint quality and uniformity. When hot plasticized metal contacts an adhesive, some of the adhesive may be incorporated into the metal and distributed as continuous (e.g. films) or fragmented contaminants throughout the weld.

Accordingly, a need remains for a method of joining metal components using fusion or solid state welding along with adhesive bonding which avoids these problems.

SUMMARY OF THE INVENTION

This need is met by the method of the present invention which combines joining via welding and via adhesive/sealants by physically separating the two joining processes, either through physical separation between the application of the two processes and/or sequencing their use. The method includes steps of providing a first metal component having a first joint surface, providing a second metal component having a second joint surface, fusion or solid state welding the first and second joint surfaces together and depositing adhesive material between the first and second joint surfaces. Adhesive material may be dispensed into a recess defined in the second joint surface. The first component may define an opening for delivery of the adhesive into the recess in the second joint surface. The adhesive may be pre-placed prior to welding (using a curable adhesive that may be expandable) or applied after welding through controlled injection.

The welds may be elongated or the components may be welded in a plurality of locations with adhesive located at positions between the welds. The recess in the second component may surround the welds.

The adhesive material may include a reinforcing member such as fibers or mesh. The reinforcing member may further comprise a locking member which engages with at least one of the first and second joint surfaces. Alternatively, the adhesive material may be expandable.

The present invention further includes an assembly of joined metal components produced according to the method of the present invention. The method of the present invention is particularly suited for producing joints between the first and second components of an aircraft fuselage such as between a skin member and a stringer or for joining components of an automobile.

A complete understanding of the invention will be obtained from the following description when taken in connection with the accompanying drawing figures wherein like reference characters identify like parts throughout.

DETAILED DESCRIPTION OF THE PREFERRED EMBODIMENTS

Figure 1:
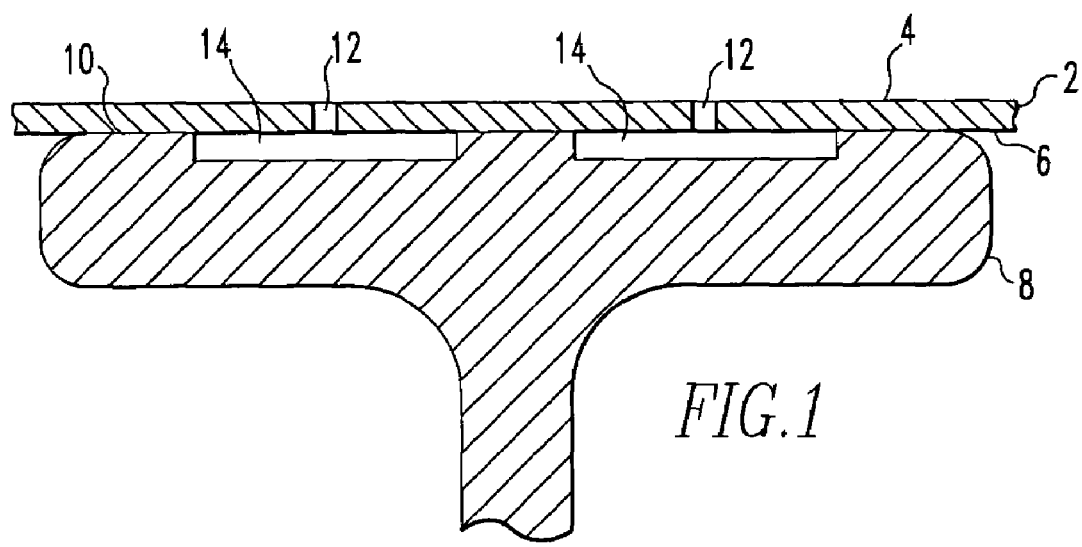
FIG. 1 is a cross section of a pair of metal components prior to joining.

For purposes of the description hereinafter, the terms "upper", "lower", "right", "left", "vertical", "horizontal", "top", "bottom" and derivatives thereof relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is directed to a method of producing joined metal components using fusion or solid-state welding with adhesives or sealants. An important feature of the present invention is that the adverse interactions of these two types of joining processes can be avoided by separating the joints produced by each process in time and space. The welds produced according to the present invention are fusion welds or solid-state welds and are referred to generically hereinafter as "welds" or "welding". Suitable fusion welding processes include gas metal arc welding, laser beam welding, electron beam welding, and resistance seam welding Suitable sold-state welding processes include friction stir welding, forging, clinching and ultrasonic seam welding. The present invention is particularly suited for use in joining aluminum alloy components.

Figure 2:
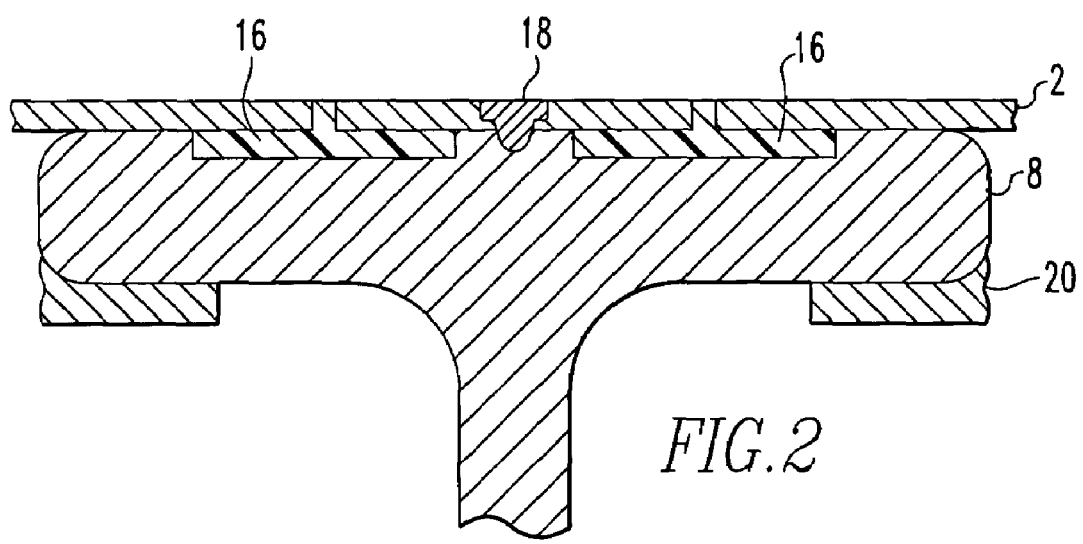
FIG. 2 shows the components of FIG. 1 after welding and dispensing of adhesive according to the present invention using a backing plate.

Referring to FIGS. 1 and 2, a first metal component 2 having an exposed surface 4 and a first joint surface 6 is positioned against a second metal component 8 having a second joint surface 10. FIG. 1 depicts the first component 2 as being a sheet product and a second component 8 as being a structural component such as a rib. This arrangement is not meant to be limiting; other shapes of metal components may be joined according to the method of the present invention. The first component 2 defines at least one opening 12 therethrough. The opening 12 is aligned with a recess 14 defined in the second component 8. The opening 12 and the recess 14 are sized and configured for dispensing adhesive through the opening 12 into the recess 14. The recesses 14 are shown and described as being defined in the second component 8, however they may instead be defined in the first joint surface 6 of the first component 2 or in both of the components 2, 8.

Referring to FIG. 2, adhesive material 16 is inserted (e.g. injected) through the opening 12 and fills the recess 14. Adhesive 16 may also fill the opening 12. Prior to dispensing adhesive or after dispensing the adhesive into the recess 14, the components 2 and 8 are welded together at location 18. The weld 18 shown in FIG. 2 is depicted as being the result of friction stir welding. If the adhesive 16 is introduced into recesses 14 before the weld 18 is formed (through placement of an adhesive/sealant pad or the like), it may be helpful to support the second component 8 with a support member such as a backing plate 20 that provides a surface against which the second component 8 bears when urging the first component 2 against the second component 8 to ensure contact of the adhesive 16 with the first joint surface until the adhesive 16 sets. Nonlimiting examples of injectable adhesive/sealant material for use in the present invention include epoxy-based structural adhesives, silicones and polysulfides.

Figure 3:
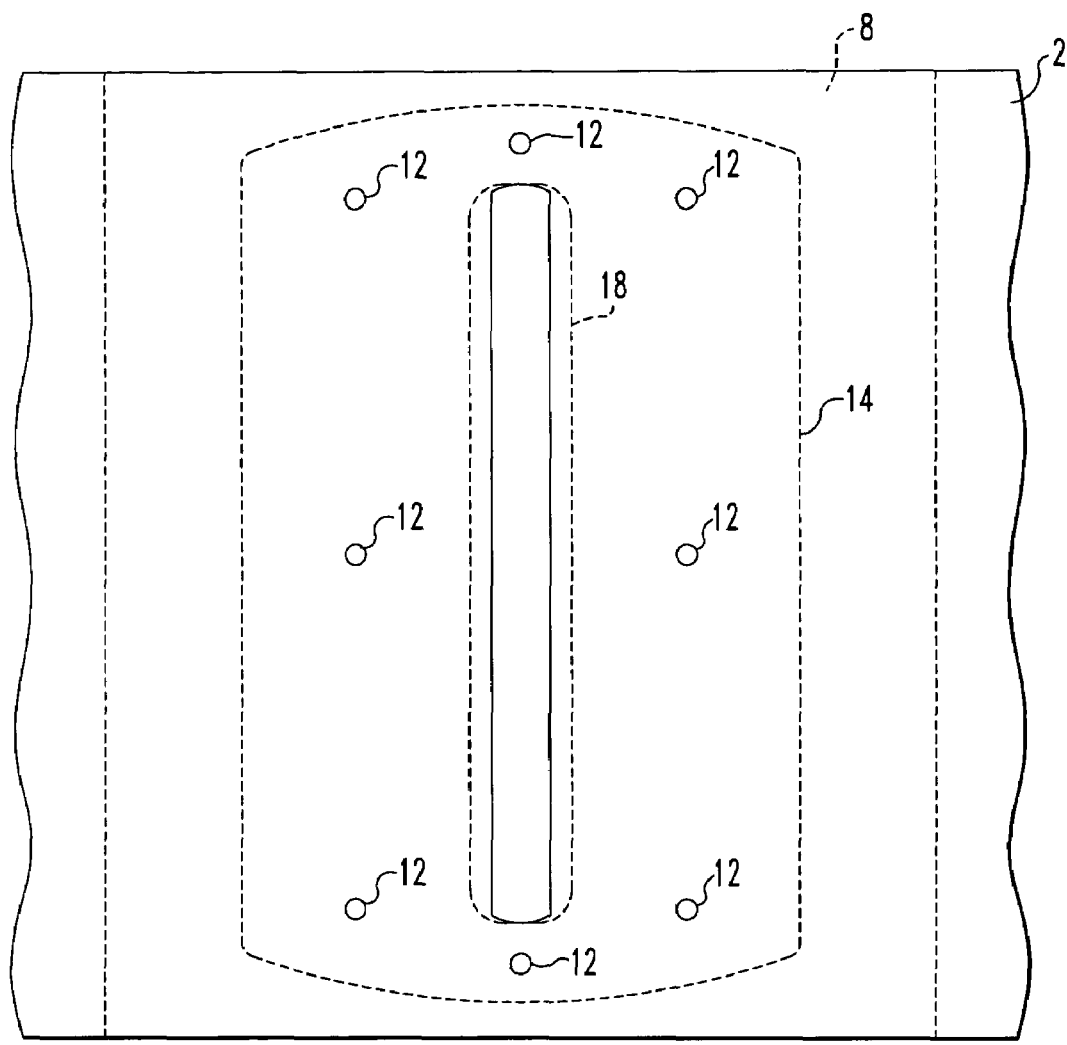
FIG. 3 is a top view of the welded components of FIG. 2.

Referring to FIG. 3, the recess 14 may be continuous and surround the length of the weld 18. A plurality of openings 12 in component 2 are shown. The quantity and placement of the openings 12 is dependent on the size of the recess 14. The adhesive surrounding the weld 18 serves to strengthen the bond between the components 2 and 8 as wells as to seal off the portion of the weld 18 between the components 2,8 from the environment.

Figure 4:
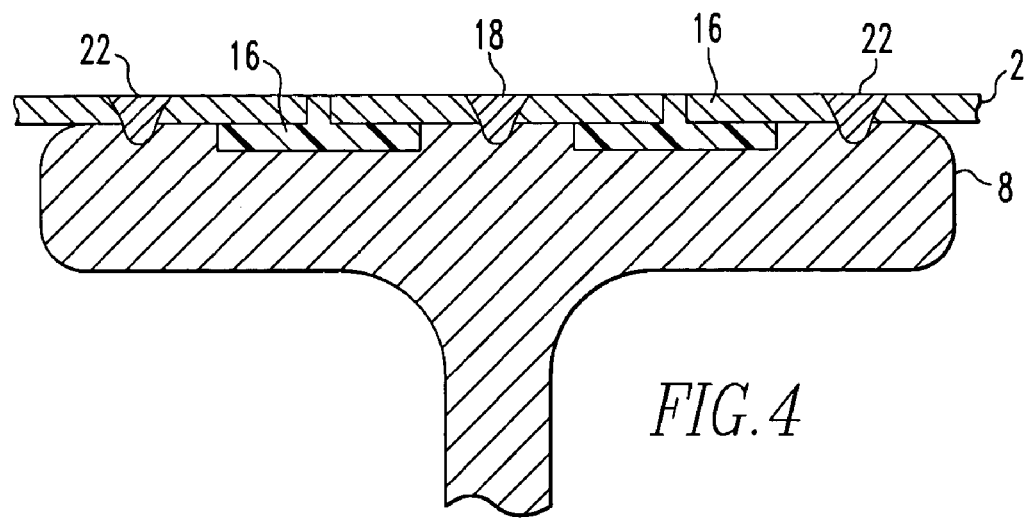
FIG. 4 is a cross section of an alternative arrangement of welds and adhesive in a joint between two components.

In the embodiment of FIG. 4, sealing welds 22 are produced outside the periphery of the recess 14 prior to dispensing the adhesive 16. By joining the edges of the components 2 and 8 together, adhesive 16 may be dispensed into the recess 14 without use of a backing plate 20 or other device to force mating between components 2 and 8.

Figure 5:
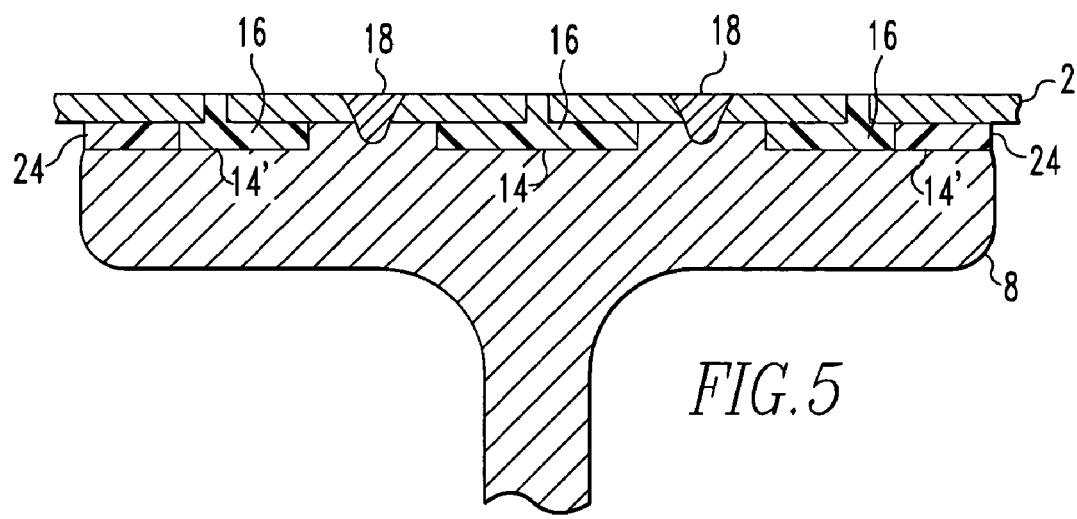
FIG. 5 is a cross section of an alternative arrangement of welds and adhesive in a joint between two components.

Another embodiment shown in FIG. 5 features adhesive dams (or pads) 24 positioned at the edges of the second component 8. The adhesive dams 24 occupy a peripheral portion of recesses 14' which extend to the edge of the second component 18. Adhesive dams 24 are inserted into the peripheries of recesses 14' prior to dispensing the adhesive 16. The adhesive dams 24 adhere to both of the first and second components 2 and 8 and maintain the components 2 and 8 in contact with each other during welding or dispensing of the adhesive 16 thereby obviating the need for a backing plate 20 or the like. The pre-formed dams 24 may be epoxy-based structural adhesives in the form of a tape.

Joints between the first and second components 2, 8 described above may generally be joined according to the following process. The components 2, 8 to be joined are placed in their proper relative spatial relationship with the aid of a fixturing device and/or use of tack spot joints such as via resistance spot welding or riveting or optionally by applying sealing welds 22 or adhesive dams 24. The first component 2 is fusion or solid state welded to the second component 8. Adhesive 16 is injected through openings 12 into the recesses 14 while maintaining the first component 2 abutting the second component 8, optionally with backing plate 20 as needed. The adhesive 16 may require curing at room temperature or heating to set. Alternatively, adhesive/sealant pads may be placed in the recesses between components 2 and 8 prior to welding, thereby eliminating the need to inject adhesive after welding.

Figure 6:
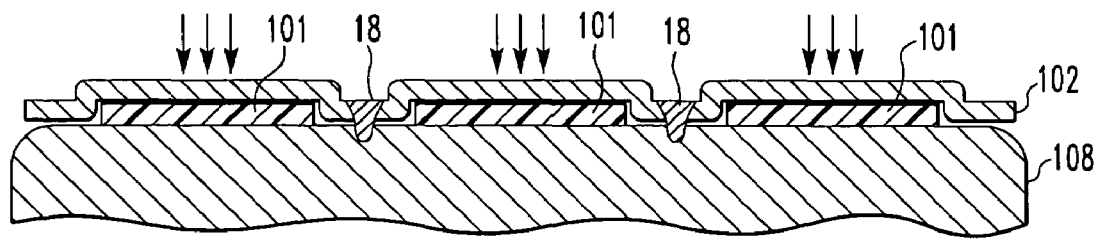
FIG. 6 is a cross section of a pair of joined metal components utilizing expandable adhesive and welding.

Referring to FIG. 6, the present invention may be practiced without using recesses in the components to be joined. Expandable adhesive members 101 are sandwiched between first component 102 and second component 108 prior to welding. Welds 18 are formed in between the locations of adhesive members 101. The material of the adhesive members 101 is cured or activated to expand their size, shown exaggerated in FIG. 6. Pressure indicated by the arrows is applied to the first component 102 in the locations of the adhesive members 101 to adhere the components 102 and 108 together.

Figure 7:
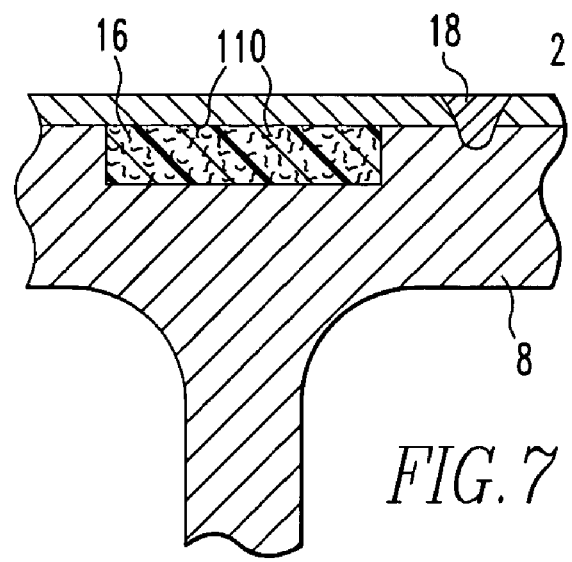
FIG. 7 is a cross section of welded components joined according to the present invention using an adhesive with a reinforcing member.
Figure 8:
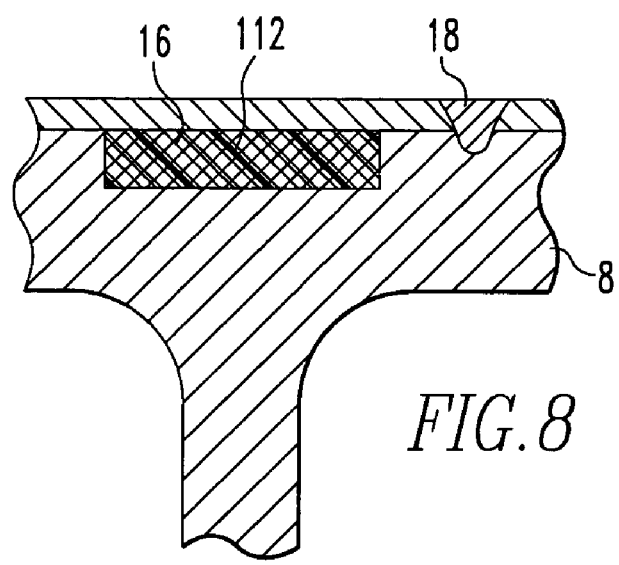
FIG. 8 is a cross section of welded components joined according to the present invention using an adhesive with a reinforcing member.
Figure 9:
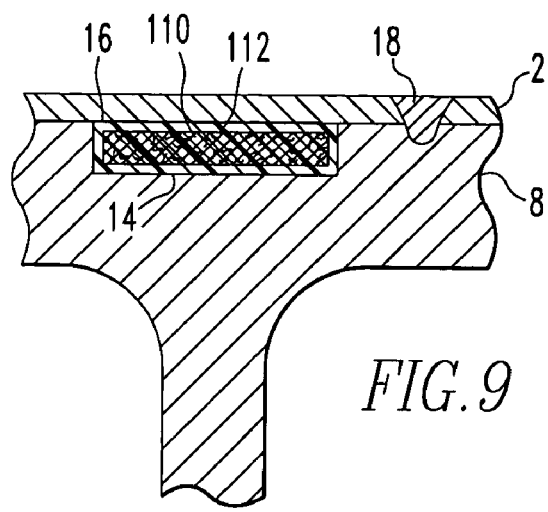
FIG. 9 is a cross section of welded components joined according to the present invention using an adhesive with a reinforcing member.

As shown in FIGS. 7–9, the recesses 14 may include reinforcing members in addition to the adhesive material 16. Suitable reinforcing members includes metal fibers 110 (FIG. 7) and metal mesh 112 (FIG. 8) or combinations thereof as shown in FIG. 9 where recess 14 contains adhesive material 16 along with fibers 110 and mesh 112.

Figure 10:
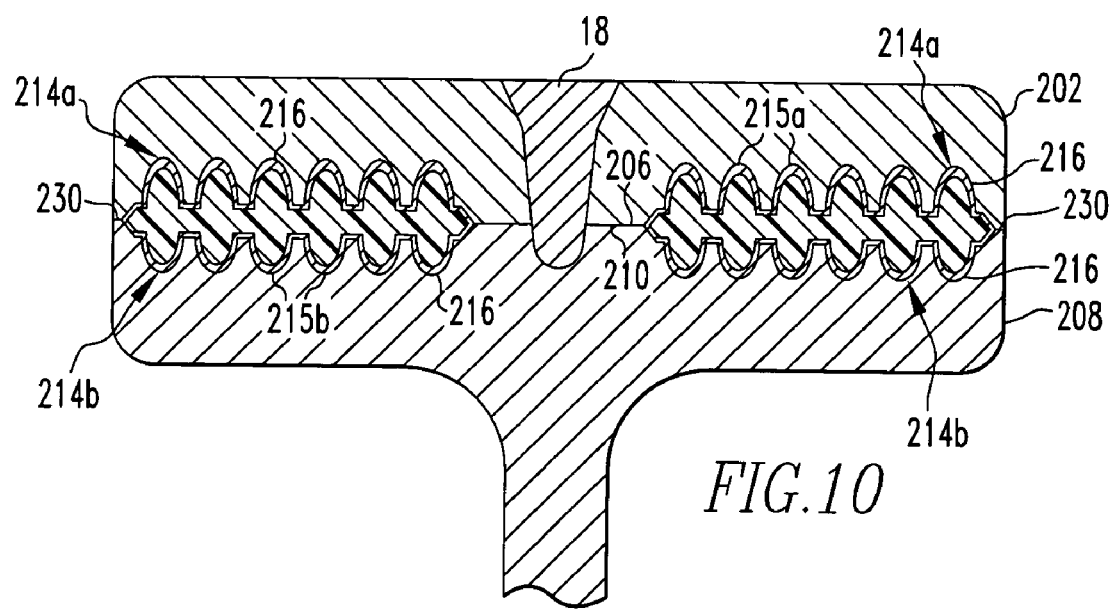
FIG. 10 is a cross section of metal components joined using a locking member, adhesive and welding.

In yet another embodiment of the invention, both components to be joined define recesses for receiving adhesive material. In FIG. 10, first component 202 has a first joint surface 206 and second component 208 has a second joint surface 210. Joint surface 206 defines recesses 214a having a plurality of extensions 215a. Joint surface 210 likewise defines recesses 214b with extensions 215b. Adhesive material 216 lines the interior surfaces of the recesses 214a and 214b. A locking member 230 is shaped and configured to fit within adjoining recesses 214a and 214b. Locking member 230 may be made of a plastic, fiber-reinforced material or the like. The adhesive material 216 serves to adhere the locking member 230 to each of the first and second components 202 and 206. As in other embodiments, a fusion or solid-state weld 18 is formed between the location of the adhesive joints using locking members 230. Other configurations for the recesses 214a and 215b and the locking members 230 are possible.

Assembly of metal components according to the present invention is beneficial in the structural redundancy of two joining processes. Most welding processes that involve heat such as gas metal arc welding, laser beam welding and friction stir welding, produce welds and heat affected zones that have mechanical properties which are inferior to the properties of the metals being joined. By combining adhesive bonding with welding, the strength of the adhesive bonding can compensate for the weakened welded regions. In addition, adhesive bonding overcomes some of the inherently lower fatigue life of certain welded joints such as lap penetration joints. The assembly of joint components is more tolerant to damage and minimizes crack propagation. Adhesives or adhesive/sealants isolate the interface between the components to prevent migration of moisture or other corrosive materials could otherwise trigger accelerated crevice-corrosion attack. In general, it is beneficial to space apart the edges of the welding from the adhesive material by about 1–3 mm.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. An assembly of joined metal components comprising:
   a first component having an exposed surface and a first joint surface;
   a second component having a second joint surface abutting said first joint surface and at least one recess forming a space between the first joint surface and the second component;
   adhesive material completely filling the space formed by the at least one recess in the second component and the first joint surface of the first component, wherein the adhesive material is substantially enclosed within the at least one recess; and
   a fusion or solid state weld extending from said exposed surface into said second component at a portion of said second joint surface separate from said at least one recess containing said adhesive material filling;
   wherein said adhesive material is disposed to form a), b), or both a) and b), wherein a) is a barrier isolating the interface between the components from moisture or other corrosive materials; and b) is a reinforcing member to compensate for a reduction in the components mechanical properties caused by the welded region.

2. The assembly of claim 1, wherein said exposed surface defines an opening aligned with said at least one recess for delivering said adhesive material into said at least one recess.

3. The assembly of claim 1 wherein said weld is a fusion weld.

4. The assembly of claim 1, wherein said weld is a solid state weld.

5. The assembly of claim 1, wherein said at least one recess surrounds said weld.

6. The assembly of claim 5, wherein said weld is elongated.

7. The assembly of claim 1, comprising a plurality of said welds with said adhesive material located at positions between said welds.

8. The assembly of claim 1, wherein said weld is spaced about 1–3 mm from said adhesive material.

9. The assembly of claim 1, wherein said adhesive material comprises a reinforcing member.

10. The assembly of claim 9, wherein said reinforcing member comprises a locking member engaging with at least one of said first and second joint surfaces.

11. The assembly of claim 9, wherein said reinforcing member comprises a plurality of fibers or a mesh.

12. The assembly of claim 1, wherein said adhesive material is expandable.

13. The assembly of claim 1, wherein said first and second components are components of an aircraft fuselage.

14. The assembly of claim 13, wherein said first component comprises a skin member and said second component comprises a stringer.

15. The assembly of claim 1, wherein said first and second components are components of an automobile.

16. A method of joining metal components comprising the steps of:
   providing a first component having a first joint surface;
   providing a second component having a second joint surface and at least one recess;
   contacting the first joint surface of the first component with the second joint surface of the second component, wherein the at least one recess forms a space between the first joint surface of the first component and the second component; and
   in any order, fusion or solid state welding the first joint surface to a portion of the second joint surface that is separate from the at least one recess and completely filling the space between the first joint surface of the first component and the at least one recess of the second joint surface with an adhesive material,
   wherein said adhesive material is substantially enclosed within the at least one recess to form a), b), or both a) and b), wherein a) is a barrier isolating the interface between the components from moisture or other corrosive materials; and b) is a reinforcing member to compensate for a reduction in the components mechanical properties caused by the welded region.

17. The method of claim 16 wherein said step of filling comprises placing a pad of an adhesive material into the recess prior to welding.

18. The method of claim 16, wherein said step of depositing adhesive material comprises dispensing adhesive material through an opening defined in the first component and in fluid communication with a recess.

19. The method of claim 16, wherein said welding step comprises fusion welding the first joint surface to the second joint surface.

20. The method of claim 19, wherein said welding step comprises solid state welding the first joint surface to the second joint surface.

* * * * *